(No Model.)
J. M. HANSCOM.
METAL BORING TOOL.
No. 281,687. Patented July 24, 1883.
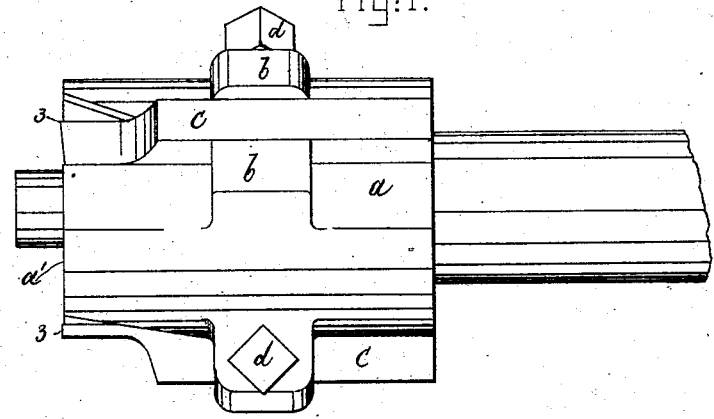
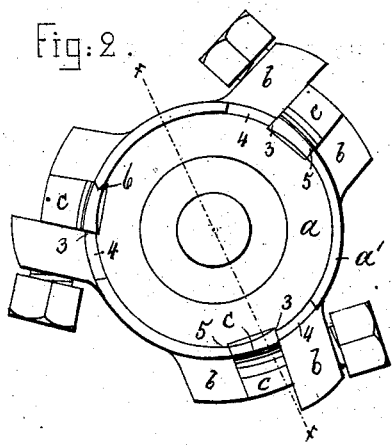
Witnesses.
Inventor.
Jackson M. Hanscom
by Crosby & Gregory
Attys

UNITED STATES PATENT OFFICE.

JACKSON M. HANSCOM, OF BOSTON, MASSACHUSETTS.

METAL-BORING TOOL.

SPECIFICATION forming part of Letters Patent No. 281,687, dated July 24, 1883.

Application filed March 30, 1883. (No model.)

*To all whom it may concern:*

Be it known that I, JACKSON M. HANSCOM, of Boston, county of Suffolk, State of Massachusetts, have invented an Improvement in Metal-Boring Tools, of which the following description, in connection with the accompanying drawings, is a specification, like letters on the drawings representing like parts.

My invention relates to a tool for boring metal plates, such as are used for preparing the plates of boilers to receive the tubes or flues. Tools for doing this work as heretofore made have usually consisted of two or more cutters revolved by a cutter-head to cut an annular channel in the plate, the outer side of which channel is of the diameter of the hole to be produced in the plate. These cutters have usually been connected with the cutter-head only at their shanks, and have been unsupported for some distance from the cutting-edge, thus necessitating that the cutters shall be very stout, and the channel cut in the metal consequently of considerable width.

My invention consists in the combination, with the cutters, of a cutter-head having a supporting and guiding flange which enters the channel being cut and supports the cutters throughout their entire length, thus enabling a much narrower cutter to be used, and consequently requiring a smaller amount of metal to be removed, and much less power to be expended in boring the plate. The said guiding-flange also regulates the depth of the cut or thickness of the chips removed, and thus insures the perfect operation of all the cutters until the plate is entirely cut through.

Figure 1 is a side elevation of a boring-tool embodying this invention; Fig. 2, a front end elevation thereof; Fig. 3, a longitudinal section on line $x\ x$, Fig. 2; and Fig. 4, a detail showing the cutting end of one of the cutters and the supporting guiding-flange.

The cutter-head $a$ consists, mainly, of a cylindrical block, the external diameter of which is a trifle smaller than that of the hole to be cut, it being provided with a series of lugs, $b$, forming clamping-sockets for the shanks of the cutters $c$, which are securely fixed therein by clamping devices, (shown as set-screws $d$,) the said lugs $b$ and screws $d$ constituting the clamps for the cutters. The end of the cutter-head $a$ is made as a thin cylinder, $a'$, adapted to enter the channel 2 (see Fig. 3) being cut, the cutting-edges 3 of the cutters $c$ being slightly wider than the thickness of the said flange $a'$, so as to afford sufficient clearance and prevent the said flange from binding in the channel made by the cutters. The cutting-edges 3 of the cutters project slightly beyond the end of the guiding-flange $a'$, as shown in Fig. 1, a distance equal to the thickness of the chip to be removed or the depth of the cut of each tool, the said flange $a'$, by its engagement with the bottom of the channel, preventing the cutters from being drawn in too deeply. The guiding-flange $a'$ has openings 4 (see Fig. 4) in front of the cutters, to afford spaces for the said cutters to operate and for the chips to escape, and the said flange affords a support for the cutter at its rear side throughout its entire length, as shown at 5, the contact-face between the rear side of the said cutter and the guiding-flange being somewhat beveled or inclined from a radial position, as shown in Fig. 2, to prevent the cutter from springing radially; or, if desired, the juncture of the said cutter and guiding-flange may be V-shaped, as shown at 6, Fig. 2, to prevent any lateral movement of the said cutter. The cutters, being thus supported at their extremities, may be made much thinner than when held only at their shanks, and consequently a much narrower channel may be cut in the metal plate and less power is required in boring it. If, when the plate is nearly cut through, one of the cutters passes through in advance of the others, the end of the flange $a'$ prevents the cutters which are still acting on the metal from being drawn too deeply therein, and thus being broken or failing to operate properly, as is the case when the cutter-head has no guiding-flange in the channel being cut. The cutter-head $a$ is mounted upon and guided by a suitable arbor, $m$, having a small central projection or spindle, $n$, to enter a small hole drilled in the plate being cut, to thus properly guide the tool.

I claim—

1. A cutter-head provided with cutter-holding clamps, and a cylindrical guiding-flange for supporting the cutters throughout their entire length, substantially as described.

2. The cylindrical cutter-head having clamps and a recessed guiding-flange, combined with the cutters having shanks to be held by the said clamps, and having their cutting ends supported in the said recesses, the contact-faces of the said cutters and flange being constructed as described, to prevent lateral movement of the cutters, substantially as set forth.

In testimony whereof I have signed my name to this specification in the presence of two subscribing witnesses.

JACKSON M. HANSCOM.

Witnesses:
 Jos. P. LIVERMORE,
 W. H. SIGSTON.